(12) United States Patent
Wobben

(10) Patent No.: US 8,301,313 B2
(45) Date of Patent: *Oct. 30, 2012

(54) METHOD OF REDUCING POWER PROVIDED BY A WIND POWER INSTALLATION BASED ON NETWORK CONDITIONS

(76) Inventor: Aloys Wobben, Aurich (DE)

( * ) Notice: Subject to any disclaimer, the term of this patent is extended or adjusted under 35 U.S.C. 154(b) by 166 days.

This patent is subject to a terminal disclaimer.

(21) Appl. No.: 12/834,761

(22) Filed: Jul. 12, 2010

(65) Prior Publication Data

US 2010/0276931 A1 Nov. 4, 2010

Related U.S. Application Data

(60) Continuation of application No. 11/489,186, filed on Jul. 18, 2006, now Pat. No. 7,830,029, which is a division of application No. 11/345,034, filed on Feb. 1, 2006, now Pat. No. 7,392,114, which is a continuation of application No. 10/490,896, filed as application No. PCT/EP02/10627 on Sep. 21, 2002, now Pat. No. 7,638,893.

(30) Foreign Application Priority Data

Sep. 28, 2001 (DE) .................................. 10 148 225

(51) Int. Cl.
*F03D 9/00* (2006.01)
*H02P 9/04* (2006.01)
*G05D 17/02* (2006.01)

(52) U.S. Cl. ............. 700/297; 290/44; 290/55; 323/299
(58) Field of Classification Search ............. 700/20–22, 700/286, 287, 292–294, 297; 290/44–46, 290/52, 55; 323/299–304, 318; 322/21–25, 322/28, 29, 32; 361/20, 21, 52, 53; 307/72, 307/73, 85–87
See application file for complete search history.

(56) References Cited

U.S. PATENT DOCUMENTS 3,988,592 A 10/1976 Porter ............................. 290/53
(Continued)

FOREIGN PATENT DOCUMENTS

CA 24315003 7/1999
(Continued)

OTHER PUBLICATIONS

ANSI/IEEE, "IEEE Recommended Practice for Utility Interconnection of Small Wind Energy Conversion System," pp. 7-12, Nov. 30, 1987, retrieved from http://ieeexplore.ieee.org/iell/2358/1238/00029137.pdf?isNumber=1238&prod—STD&arnumber=29137&arST=&ared=&arAuthor= on Dec. 2, 2002.

(Continued)

*Primary Examiner* — M. N. Von Buhr
(74) *Attorney, Agent, or Firm* — Seed IP Law Group PLLC

(57) ABSTRACT

A wind park system is disclosed. Briefly described, one embodiment comprises at least one wind power installation having a generator for the delivery of electrical power to an electrical network, characterized in that the power delivered to the network by the wind park is regulated or adjusted in dependence on the network frequency of the electrical network.

15 Claims, 8 Drawing Sheets

U.S. PATENT DOCUMENTS

| | | | | |
|---|---|---|---|---|
| 4,159,427 A | | 6/1979 | Wiedemann | 290/55 |
| 4,189,648 A | | 2/1980 | Harner | 290/44 |
| 4,511,807 A | | 4/1985 | Somerville | 290/44 |
| 4,535,252 A | * | 8/1985 | Jacobs et al. | 290/44 |
| 4,565,929 A | * | 1/1986 | Baskin et al. | 290/44 |
| 4,605,530 A | * | 8/1986 | Tatemichi | 376/237 |
| 4,656,413 A | | 4/1987 | Bourbeau | 322/47 |
| 4,788,653 A | * | 11/1988 | Henderson et al. | 708/300 |
| 4,982,141 A | | 1/1991 | Pace et al. | 315/169.3 |
| 4,994,684 A | | 2/1991 | Lauw et al. | 290/52 |
| 5,028,804 A | | 7/1991 | Lauw | 290/40 C |
| 5,082,077 A | | 1/1992 | Holka | 180/79.3 |
| 5,083,039 A | | 1/1992 | Richardson et al. | 290/44 |
| 5,225,712 A | * | 7/1993 | Erdman | 290/44 |
| 5,239,251 A | | 8/1993 | Lauw | 318/767 |
| 5,734,257 A | | 3/1998 | Schauder et al. | 323/207 |
| 5,798,631 A | | 8/1998 | Spée et al. | 322/25 |
| 5,798,632 A | | 8/1998 | Muljadi | 322/29 |
| 5,907,192 A | * | 5/1999 | Lyons et al. | 290/44 |
| 6,049,194 A | | 4/2000 | Nakagawa et al. | 322/20 |
| 6,188,205 B1 | * | 2/2001 | Tanimoto et al. | 323/205 |
| 6,219,623 B1 | | 4/2001 | Wills | 702/60 |
| 6,323,624 B1 | | 11/2001 | Henriksen | 322/20 |
| 6,420,795 B1 | * | 7/2002 | Mikhail et al. | 290/44 |
| 6,452,289 B1 | * | 9/2002 | Lansberry et al. | 307/25 |
| 6,512,966 B2 | * | 1/2003 | Lof et al. | 700/291 |
| 6,670,721 B2 | | 12/2003 | Lof et al. | 290/44 |
| 6,815,932 B2 | | 11/2004 | Wall | 322/20 |
| 6,836,028 B2 | | 12/2004 | Northrup et al. | 290/44 |
| 6,891,280 B2 | | 5/2005 | Siegfriedsen | 290/44 |
| 6,891,281 B2 | * | 5/2005 | Wobben | 290/44 |
| 7,233,129 B2 | | 6/2007 | Erdman et al. | 322/17 |
| 7,256,508 B2 | | 8/2007 | Altemark et al. | 290/44 |
| 7,268,443 B2 | | 9/2007 | Kikuchi et al. | 290/44 |
| 7,271,500 B1 | | 9/2007 | Kimura et al. | 290/52 |
| 7,392,114 B2 | * | 6/2008 | Wobben | 700/286 |
| 7,462,947 B2 | * | 12/2008 | Wobben | 290/44 |
| 7,638,893 B2 | * | 12/2009 | Wobben | 290/55 |
| 7,830,029 B2 | * | 11/2010 | Wobben | 290/44 |

FOREIGN PATENT DOCUMENTS

| | | |
|---|---|---|
| CN | 1524162 | 8/2004 |
| DE | 296 21 449 U1 | 2/1997 |
| DE | 196 20 906 A1 | 1/1998 |
| DE | 197 56 777 A1 | 7/1999 |
| GB | 2 330 256 A | 4/1999 |
| JP | 63242127 A | 10/1988 |
| JP | 63287400 A | 11/1988 |
| JP | 2007832 | 1/1990 |
| JP | 05265583 A | 10/1993 |
| JP | 06022443 A | 1/1994 |
| JP | 07147728 A | 6/1995 |
| JP | 07336899 A | 12/1995 |
| JP | 08280136 A | 10/1996 |
| JP | 8317568 | 11/1996 |
| JP | 9324740 | 12/1997 |
| JP | 09324740 A | 12/1997 |
| JP | 10341530 | 12/1998 |
| JP | 11082282 A | 3/1999 |
| JP | 11089093 A | 3/1999 |
| JP | 11146560 A | 5/1999 |
| JP | 11262187 A | 9/1999 |
| JP | 11262298 | 9/1999 |
| JP | 11332108 A | 11/1999 |
| JP | 2000041338 A | 2/2000 |
| JP | 2000078896 A | 3/2000 |
| JP | 2000199473 A | 7/2000 |
| JP | 2000-232736 A | 8/2000 |
| JP | 2000249036 A | 9/2000 |
| JP | 2000270479 A | 9/2000 |
| JP | 2000-333373 | 11/2000 |
| JP | 2001165032 A | 6/2001 |
| JP | 2001211551 A | 8/2001 |
| JP | 2001234845 | 8/2001 |
| JP | 2001234845 A | 8/2001 |
| WO | WO 92/14298 | 8/1992 |
| WO | WO 93/11604 | 6/1993 |
| WO | 97/34083 A1 | 9/1997 |
| WO | WO 97/45908 | 12/1997 |
| WO | WO 99/33165 | 7/1999 |
| WO | 00/73652 A1 | 12/2000 |
| WO | 01/20745 A1 | 3/2001 |
| WO | WO 01/25630 A1 | 4/2001 |
| WO | WO 01/73518 | 10/2001 |
| WO | WO 01/86143 A1 | 11/2001 |
| WO | WO02086315 | 10/2002 |
| WO | 03030329 A1 | 4/2003 |

OTHER PUBLICATIONS

Arantxa, T. et al., "Digital Simulation Performance of a Wind Farm," in *Proceedings of the 10th Mediterranean Electrotechnical Conference, Melecon 2000*, vol. III, pp. 1153-1156.

Borle et al., "Development and Testing of a 20-kW Grid Interactive Photovoltaic Power Conditioning System in Western Australia," IEEE Transactions on Industry Applications, vol. 33, No. 2, Mar./Apr. 1997, pp. 502-508.

Criado, R. et al., "Análisis y Estrategias de Control de la Energia Eólica en el Sistema Eléctrico Español," *Cogeneracion y Renovables*, pp. 93-103, Nov. 2000, retrieved from http://www.energuia.com/guia/images/DirFich/BIB1002.pdf on Dec. 2, 2002.

Haller, "A 500kW Variable Speed Gearless Wind Turbine Generator for the American Market," Windpower 94, Minnesota, May 11, 1994, pp. 151-154.

Heier, "Grid Integration of Wind Energy Conversion Systems," John Wiley & Sons Ltd., West Sussex, England, 1998, pp. 210-211, 273-278, and 326-339. Richardson et al., "Wind Energy Systems," Proceedings of the IEEE, vol. 81, No. 3, Mar. 1993, pp. 378-389.

Kundar P., "Power System Stability and Control," McGraw-Hill, Inc., New York, 1994, Chapter 11, "Control of Active Power and Reactive Power," pp. 581-687 (71 pages).

Smith, G.J., "SCADA in wind farms," in The Institution of Electrical Engineers Colloquium on Instrumentation in the Electrical Supply Industry, Jun. 29, 1993, pp. 11/1-11/2 (3 pages).

Svensson, J., "Voltage Angle Control of a Voltage Source Inverter Application to a Grid-Connected Wind Turbine," in *Proceedings of the European Conference on Power Electronics and Applications*, Sevilla, Sep. 19-21, 1995, Brussels, Sep. 19, 1995, pp. 3539-3544.

"The Benchmark in Windenergy-Technology," Enercon, Aurich, Germany, Dec. 5, 2003, pp. 1-28.

Wind, T., "Wind Turbines Offer New Voltage Control Feature," *Power Engineering*, 103(9):54-56, Sep. 1999.

\* cited by examiner

METHOD OF REDUCING POWER PROVIDED BY A WIND POWER INSTALLATION BASED ON NETWORK CONDITIONS

CROSS-REFERENCES TO RELATED APPLICATIONS

This application is a continuation of U.S. patent application Ser. No. 11/489,186, filed Jul 18, 2006, now U.S. Pat. No. 7,830,029; which is a divisional of U.S. patent application Ser. No. 11/345,034, filed Feb 1, 2006, now U.S. Pat No. 7,392,114; which is a continuation of U.S. patent application Ser. No. 10/490,896, filed Oct 22, 2004, now U.S. Pat. No. 7,638,893; which is a national phase under 35 U.S.C. §371 of PCT/EP02/10627, filed Sep 21, 2002; which is based on German Patent Application No. 10148225.6, filed Sep 28, 2001; which applications are incorporated herein by reference in their entirety.

BACKGROUND OF THE INVENTION

1. Field of the Invention

The invention concerns a method of operating a wind park and also a wind park as such.

2. Description of the Related Art

Wind power installations were initially always erected in the form of individual units and it is only in recent years that, caused also by administrative and building regulations, wind power installations are frequently installed in wind parks. In that respect a wind park in its smallest unit is an arrangement of at least two wind power installations, but frequently markedly more. By way of example mention may be made of the wind park at Holtriem (East Frisia) where more than 50 wind power installations are set up in an array. It is to be expected that the number of units and also the installed power of the wind power installations will also increase greatly in the forthcoming years. In most cases the wind potential is at its greatest in regions of the power supply networks with a low level of short-circuit power and low population density. It is precisely there that the technical connection limits are quickly reached by the wind power installations, with the result that it is then no longer possible for further wind power installations to be set up at such sites.

A conventional wind park which is connected, by way of example, to a 50 MW transformer substation can therefore provide, at a maximum, only 50 MW total power, that is to say, for example 50, wind power installations each providing 1 MW nominal power.

Bearing in mind that wind power installations are not constantly operated in the nominal mode and thus the overall wind park also does not constantly reach its maximum power, referred to herein as the nominal power, it can be found that the wind park is not put to optimum use if the nominal power of the wind park corresponds to the maximum possible total power which can be fed into the electric grid connected to the wind park.

Another issue is that in the case of low-power electrical networks, some of which are called island networks, the network frequency rises very quickly and abruptly if a relatively large consumer is separated from the electrical network. The drive machines such as, for example, diesel engines, water wheels and the like require some time in order then to reduce their mechanical and electrical power. During that period of time those generators produce more energy than is taken from the electrical network. That energy is then consumed for accelerating the generators. That means that the rotary speed and thus also the network frequency rises.

As many electrical devices, for example, computers, electric motors and the like, which are connected to the electrical network, are however not designed for fluctuating network frequencies or abrupt changes therein, that can result in damage to electrical machines, even going as far as destruction thereof.

BRIEF SUMMARY OF THE INVENTION

The invention accordingly proposes a solution in which the wind park has a total power output capacity which is higher than the maximum possible network feed-in power. When applied to the prior indicated example, the power output capacity can be raised to a value of over 50 MW, for example, 53 MW. As soon as the wind speeds are sufficiently high to produce at the maximum permitted power of 50 MW, the wind park regulating system according to the invention comes into play and regulates individual or all installations down so that the overall maximum power output is not exceeded and in such a way that it is always observed. This means that, at wind speeds above the nominal wind (wind speed at which a wind power installation reaches its nominal power), at least one or all installations are operated with a slightly throttled power output (for example, at a power level of 940 kW instead of 1 MW). It also means that at wind speeds less than the nominal amount, the wind power installations are not throttled and the wind park can more consistently produce the maximum permitted power in this example 50 MW.

The advantages of the invention are apparent. Overall the network components of the feed network (network components are, for example, the transformer and the lines) can be put to optimum use or can have their loads balanced in the optimum fashion. Utilization of the component thereof up to the thermal limit is also a possibility. In that way existing wind park areas can be better utilized, by virtue of setting up a maximum possible number of wind power installations. The number is then no longer so severely limited by the existing network capacity.

For controlling/regulating a wind power installation it is desirable if it has a data input, by which the electrical power output can be set in a range of between 0 and 100% with respect to the nominal power. If, for example, a reference value of 350 kW is applied to that data input, then the maximum power output of that wind power installation will not exceed the reference value of 350 kW. Any value from 0 to the nominal power (for example, from 0 to 1 MW) is possible as a reference value.

That data input can be used directly for power limitation purposes.

It is however also possible by means of a regulator to regulate the generator power output in dependence on the network voltage. The network voltage can be based on the wind park network or in the feed-in network.

A further important function will be discussed hereinafter on the basis of wind park regulation. It will be assumed, for example, that a wind park comprises 10 wind power installations which each have a nominal power output of 600 kW. By virtue of the capacitances of the network components; also called line capacitances or the limited capacitances in the transformer substation it will further be assumed that the maximum power that can be delivered to the network is limited to 5200 kW, also called the "limit power."

There is now the possibility of limiting each of the wind power installations to a maximum power of 520 kW by means of the reference value applied to the data input. Doing this achieves the requirement for limiting the power to be delivered is always met.

Another possibility involves not allowing the maximum power permitted of 5200 kW as the sum of all installations to be exceeded, but at the same time producing a maximum amount of energy (kW-hours (work)).

In that respect it should be recognized that, at low to moderate wind speeds within the wind park, it frequently happens that the wind power installations at the advantageous sites, these usually are the sites which the wind first encounters within the wind park receive a great deal of wind. If now all wind power installations are simultaneously controlled down to their throttled value, for example, all to 520 kW, that produced power is admittedly attained by some wind power installations arranged at good sites, while some other wind power installations which however are in the 'wind shadow' of the well-located wind power installations in the second and third rows have less wind and as a result operate, for example, only at 460 kW power and do not reach the value of the maximum throttled power of 520 kW. The overall power output from the wind park is accordingly therefore substantially below the allowed limit power output of 5200 kW.

The wind park power regulation according to the invention in that case regulates the individual installations in such a way that the maximum possible energy yield is set. This means in specific terms that, for example, the installations in the first row or other good sites are regulated to a higher power (for example, to the nominal power so therefore no throttling action is carried out. Therefore the overall electrical power in the wind park rises. Park regulation however regulates each individual installation in such a way that the maximum allowed electrical connection power is not exceeded while at the same time the work produced from the total overall wind park (kWh) reaches a maximum value.

Wind park management in accordance with the invention can be easily adapted to the respective situations which arise. Thus, for example, it is very simple to effect different throttling with respect to the power of individual installations if an individual one or a plurality of installations of a wind park are, or have to be taken from the network. If for maintenance reasons, or other reasons, an individual installation or a plurality of installations have to be temporarily stopped.

For controlling/regulating the wind park or the individual installations it is possible to use a data/control processing apparatus which is connected to the data inputs of the installations and which, from the wind speed data which are ascertained by each installation, ascertains the respective most advantageous power throttling value for an individual installation or for the entire wind park.

DETAILED DESCRIPTION OF THE INVENTION

Figure 1:
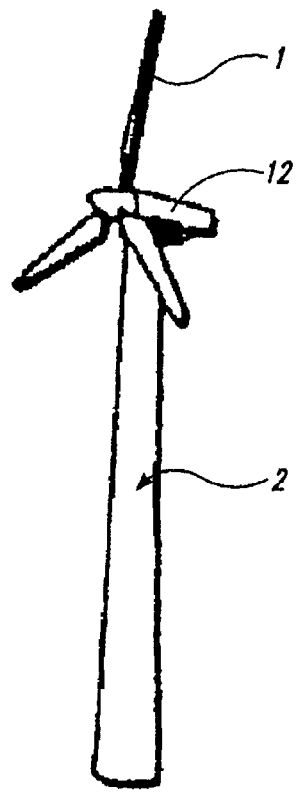
FIG. 1 is an isometric view of a wind power installation which would make use of the present invention.

FIG. 1 shows a wind power installation 2 having rotor blades 1 coupled to a rotor shaft that drives a generator 12.

Figure 2:
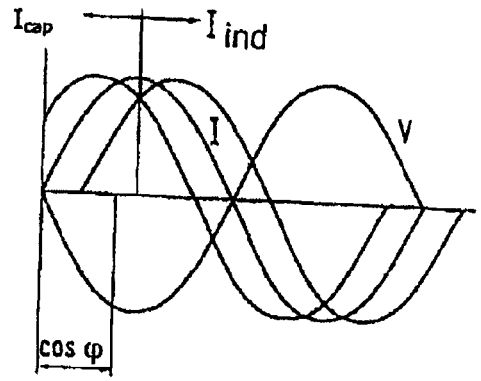
FIG. 2 is a graphic of a multi-phase alternating current that can be supplied from the wind power installation of FIG. 1 to the power supply network 6, which illustrates the power factor which may be present on the line according to principles of the present invention.

FIG. 2 shows changes that can be made to the power factor to adjust the total power delivered to the network.

Figure 3:
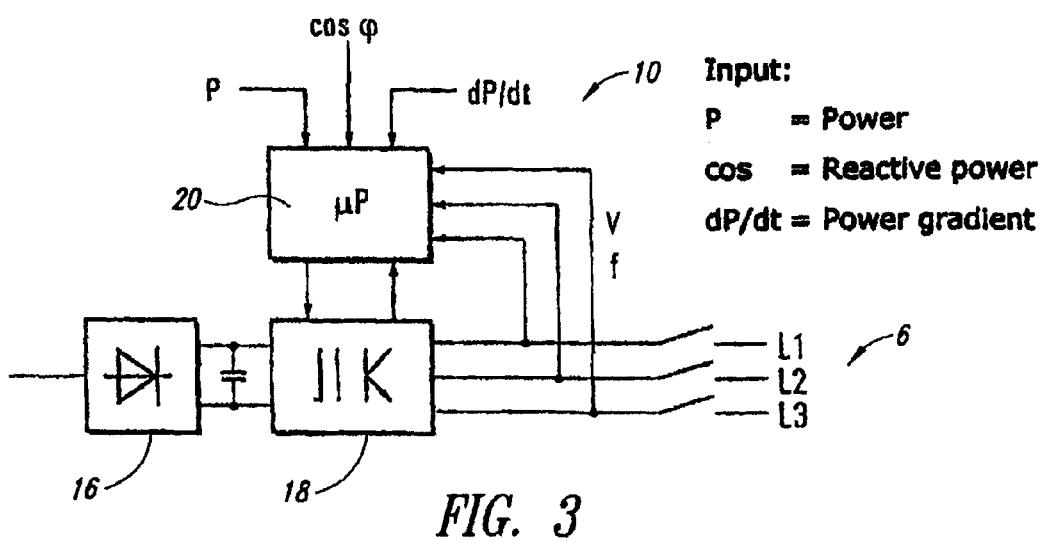
FIG. 3 is a block diagram of the control circuit for wind power installation according to principles of the present invention.

FIG. 3 is a block circuit diagram showing the control system 10 of a wind power installation. It includes a microprocessor μP 20 connected to an inverter apparatus 18 (PWR), by means of which multi-phase alternating current can be fed into the power supply network 6. The microprocessor has a power input P, an input for inputting a power factor, cos phi (cos ø) and an input for inputting the power gradient (dP/dt).

The inverter apparatus comprising a rectifier 16, a rectifier intermediate circuit and an inverter 18 is connected to the generator of a wind power installation and receives therefrom the energy produced by the generator 12, in rotary speed-variable fashion, that is to say, in dependence on the rotary speed of the rotor of the wind power installation.

The design illustrated in the FIGS. 1-3 serve to illustrate how the power delivered by a wind power installation can be limited in its amount to a maximum possible network feed-in value.

Figure 4:
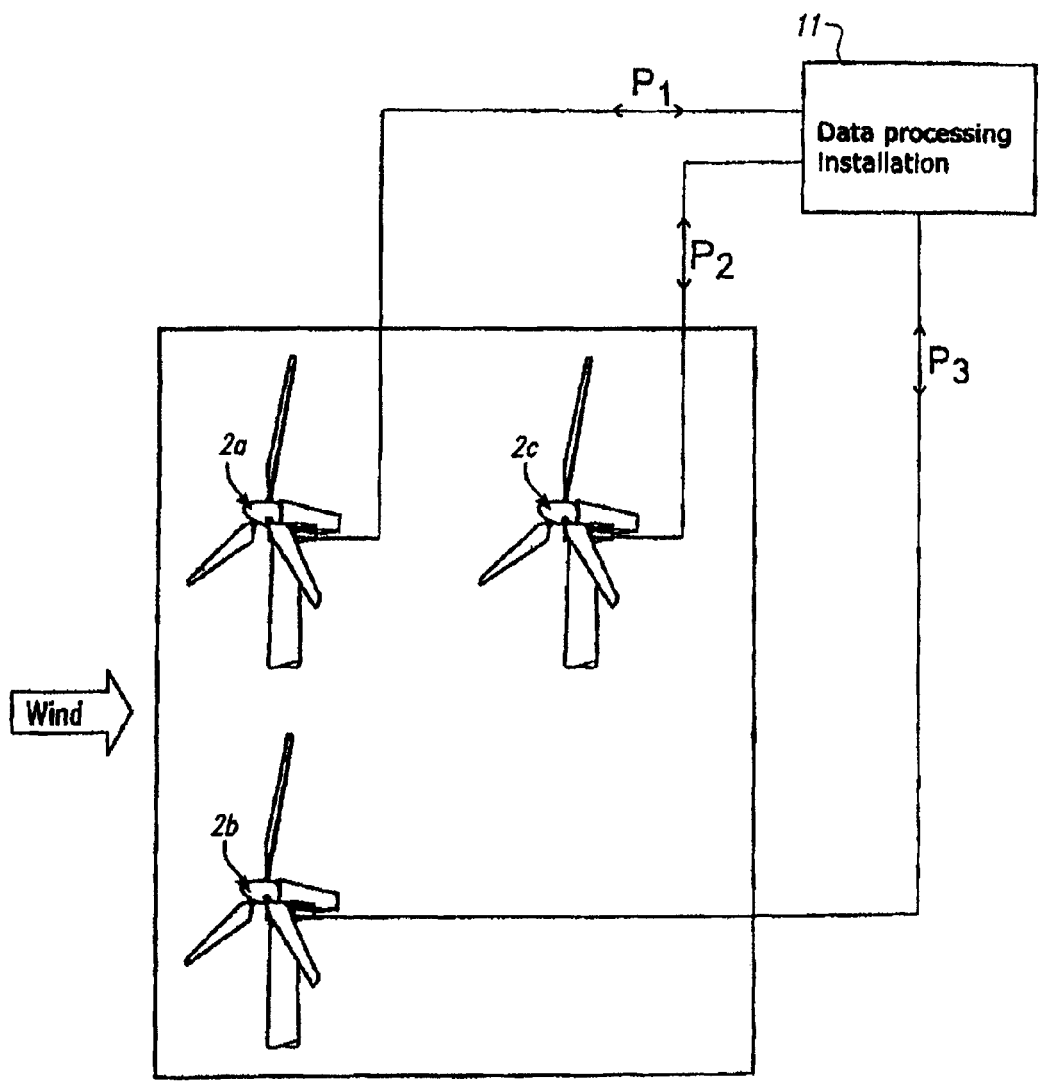
FIG. 4 is a view showing the principle of operation of an entire wind park according to the concepts of the present invention.

FIG. 4 is a view showing the principle of a wind park comprising, for example, three wind power installations 2a, 2b, and 2c of which—as viewed from the direction of the wind—two are disposed in side-by-side relationship and the third is positioned behind the first two. As each of the individual wind power installations has a power input for setting the power of the respective installation (FIG. 1), the power levels of an individual wind power installation can be set to a desired value by means of a data processing apparatus 11, by means of which the entire wind park is controlled. In FIG. 4 the advantageous sites for the wind power installations are those which the wind first encounters, that is to say the installations 2a and 2b.

The present invention also concerns a method of operating a wind park having at least one wind power installation with an electrical generator drivable by a rotor for delivering electrical power to an electrical network to which the wind power installation is connected. The invention further concerns a wind power installation comprising a rotor and an electrical generator coupled to the rotor for delivering electrical power to an electrical consumer, in particular an electrical network.

One object of another aspect of the present invention is to eliminate the above-described problems when wind power installations or a wind park is connected to the electrical network.

According to this other aspect of the invention, that object is attained by a method having the features set forth in the claims and a wind power installation having the feature set forth in the claims. Advantageous developments are correspondingly described in the appendant claims.

It is proposed in accordance with the invention, if wind power installations are operated on such low-power networks, that their mechanical and electrical power is to be controlled in dependence on the rising network frequency. That is intended to prevent a further increase in the network frequency or to provide for a reduction in the network frequency.

That aspect of the invention is described in greater detail hereinafter by means of an embodiment.

Figure 5:
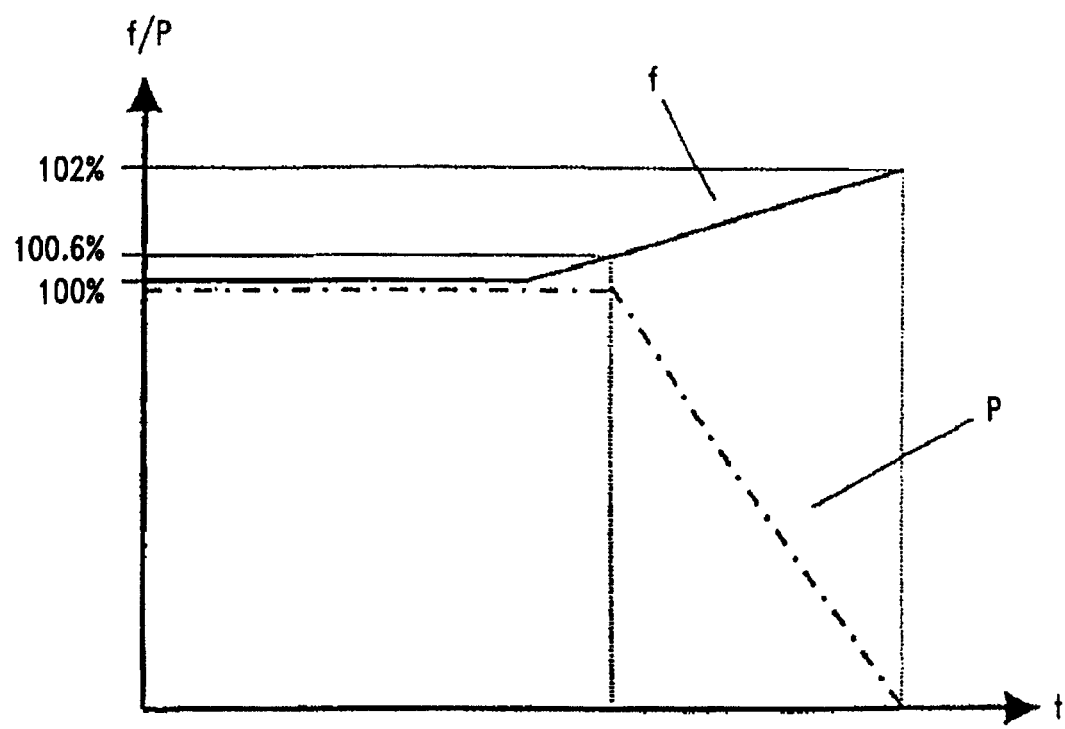
FIG. 5 shows a frequency/power time graph of a wind power installation.

FIG. 5 shows the demand on a wind power installation of a wind park to reduce its output power P in dependence on the electrical frequency f of the network. In this case the value of 100% represents the reference or target frequency (50 Hz, 60 Hz) of the electrical network. The values 100.6% and 102% respectively are correspondingly higher values of the network frequency f.

The electrical power of the wind power installation of the wind park is not yet reduced, for example, when there is a rise in the network frequency by 0.6% (that is to say to 100.6%). If thereafter the network frequency rises still further, then the electrical power of the wind power installation is reduced. In the illustrated example the electrical power of the wind power installation is reduced to zero power when there is a rise in the network frequency to 102%.

Figure 6:
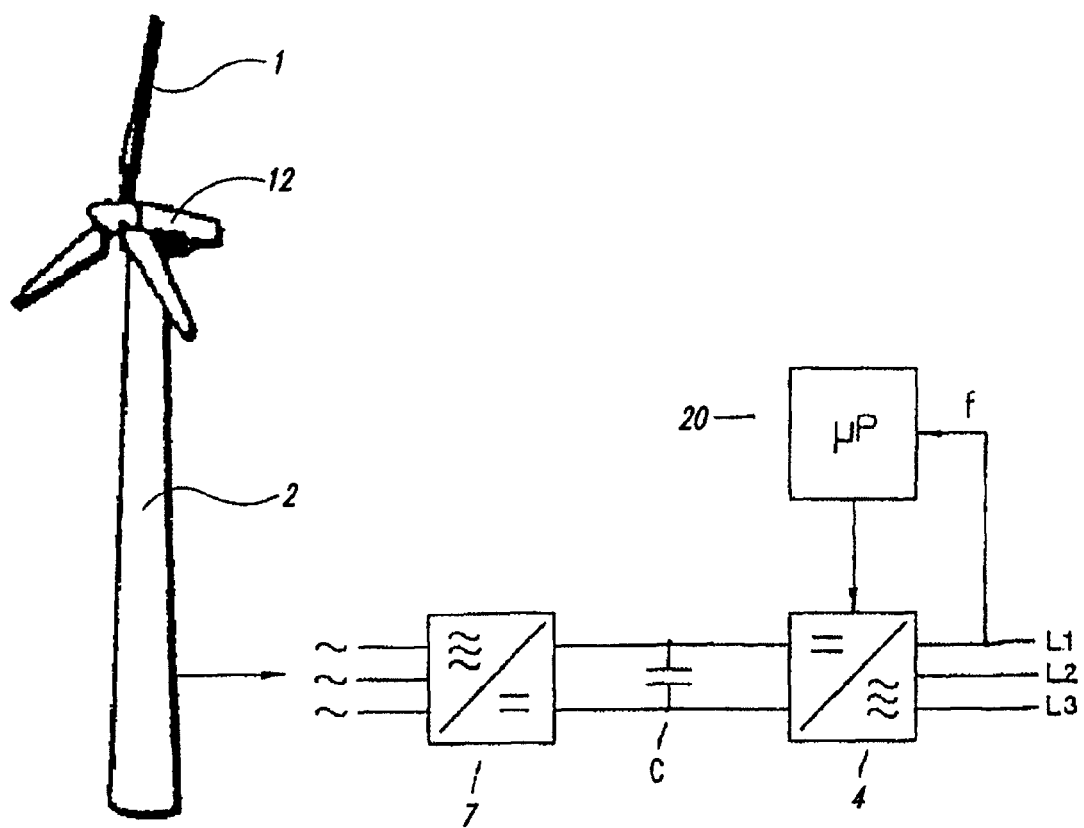
FIG. 6 shows a block circuit diagram of an inverter of a wind power installation, the inverter being controlled with a microprocessor according to the present invention.

FIG. 6 shows an embodiment of a wind power installation system which satisfies that requirement. The wind power installation 2 has adjustable rotor blades 1 whose power output can be changed by use of pitch regulation of the rotor blades so that the electrical power output of the wind power installation 2 can be reduced. If, for example, the angle of incidence of the rotor blades 1 relative to the wind is adjusted, the force on the rotor blades 1 can also be reduced to a desired value and hence the electrical power output reduced. This can be done very quickly by small, but rapid rotation of the rotor blade to vary its pitch with respect to the wind. The electrical alternating current from the generator 12 which is connected to the rotor which carries the rotor blades 1 is rectified by means of a rectifier 7 and smoothed by means of a capacitor C. The inverter 4 then converts the dc voltage into an alternating current which is delivered to the network $L_1$, $L_2$, $L_3$. The frequency of that output current is predetermined by the network. The regulating apparatus comprising a microprocessor 20 measures the network frequency and controls the power switches of the inverter in such a way that the output frequency corresponds to the network voltage and network frequency. If—as described above—the network frequency rises, the electrical power is reduced, as shown in FIG. 5.

Figure 7:
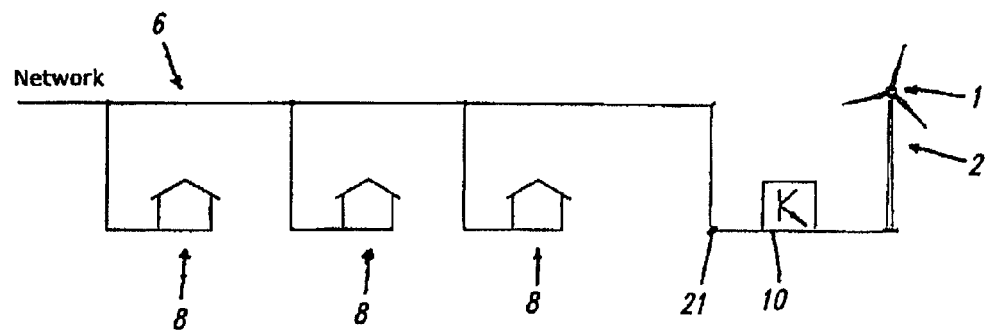
FIG. 7 is a view illustrating the coupling of a wind power installation to an electrical network according to the invention.

FIG. 7 shows the coupling of a wind power installation 2 to an electrical network 6, wherein the electrical power produced by the wind power installation is delivered at the network feed-in point 21 into the network via control system 10. A plurality of consumers 8, in the illustrated example diagrammatically shown in the form of houses, are connected to the electrical network 6.

Figure 8:
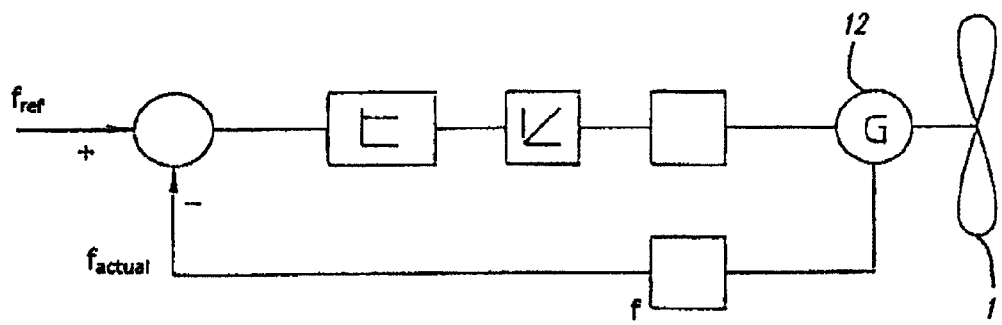
FIG. 8 is an alternative view in relation to FIG. 7.

FIG. 8 shows the regulating apparatus according to the invention. The diagrammatically illustrated rotor 1 of the wind power installation is coupled to a generator 12, G, which provides an electrical power which is dependent on the wind speed and thus the wind power. The ac voltage produced by the generator 12, G, is firstly rectified by means of the inverter and then converted into an ac voltage which is of a frequency corresponding to the network frequency. The network voltage at the network feed-in point of the network is ascertained by means of the network frequency detector. As soon as the network frequency exceeds a predetermined value—see FIG. 5—, the electrical power output is reduced in order to counteract a further increase in the network frequency. Accordingly, by means of the regulating apparatus, the network frequency of the network is regulated to a desired network frequency value, or at least a further rise therein is prevented.

Regulating the feed in that way of the power delivered by the wind power installation makes it possible to avoid or considerably reduce network frequency fluctuations.

Figure 11:
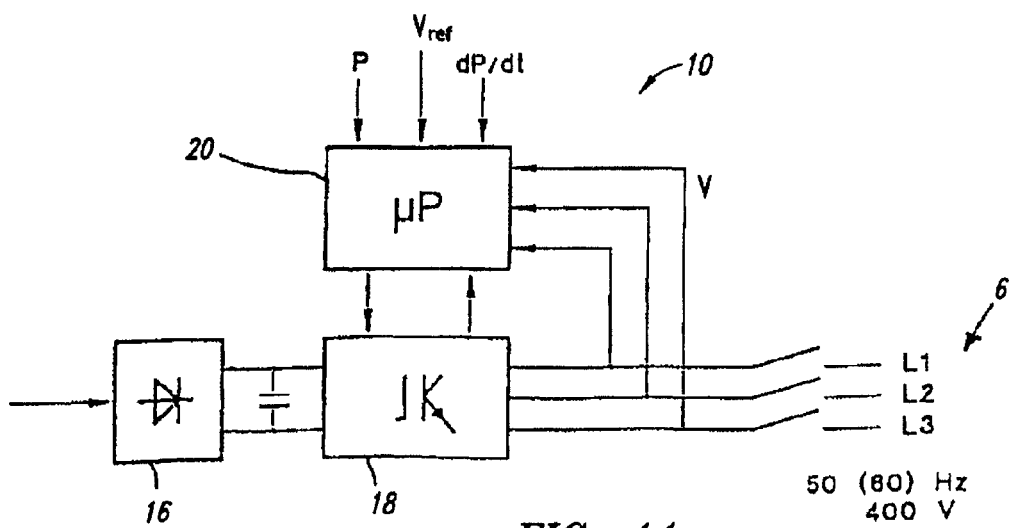
FIG. 11 shows some components of the regulating device 10 as shown in FIG. 10.

FIG. 11 shows some of the main components of the control-regulating apparatus. The control and regulating arrangement has a rectifier 16, in which the ac voltage produced in the generator is rectified. A frequency converter 18 connected to the rectifier converts the dc voltage which is initially rectified in the intermediate circuit, into an ac voltage which is fed into the network in the form of a three-phase ac voltage by way of the lines $L_1$, $L_2$, and $L_3$. The frequency converter is controlled by means of the microcomputer 20 which is part of the overall regulating apparatus. For that purpose the microprocessor is coupled to the frequency converter 18. The input parameters for regulation of the voltage, with which the electrical power made available by the wind power installation 2 is fed into the network, are the currently prevailing network voltage, the network frequency f, the electrical power P of the generator, the reactive power factor cos ø as well as the power gradient dP/dt. As explained later herein, the overall power provided by the wind power installation can be quickly changed by adjusting the power factor phase angle cos ø and the power gradient under control of the microprocessor. The microprocessor 20 embodies the regulation according to the invention in respect of the voltage to be fed in, at its desired network frequency.

The present invention further concerns a method of operating a wind park comprising at least one wind power installation having an electrical generator drivable by a rotor for delivering electrical power to an electrical network and in particular to the connected consumers thereof.

The present invention also concerns a wind power installation (wind park), in particular for carrying out such a method, comprising a rotor and an electrical generator coupled to the rotor for delivering electrical power to an electrical network, and a wind park having at least two wind power installations.

In the known wind power installations for producing electrical energy from wind energy, the generator is operated in parallel mode with an electrical consumer, frequently an electrical network. During operation of the wind power installation the electrical active power produced by the generator can vary in dependence on the currently prevailing wind speed. The consequence of this is that the network voltage (magnitude and/or phase) can also be variable, for example, at the feed-in point, in dependence on the currently prevailing wind speed. The same also applies for the current to be fed in.

In a situation involving feeding the electrical power produced into an electrical network, for example, a public power network fluctuations in the network voltage can occur. However, such fluctuations are permissible only within very close limits, in the interests of reliable operation of connected consumers.

Relatively large deviations from the reference value in respect of the network voltage in the power supply network, in particular at the medium-voltage level, can be compensated, for example, by actuating switching devices such as step transformers, insofar as they are actuated when the values exceed or fall below predetermined limit values. In that way the network voltage is kept substantially constant within predetermined tolerance limits.

One further object of another aspect of the present invention is to provide a method of operating a wind power installation as well as a wind power installation or wind park, which, even with a fluctuating active power delivery, are in a position to reduce or at least not significantly increase the unwanted fluctuations in the voltage at a predetermined point in the network in comparison with the situation without a wind power installation or installations.

The invention attains that object, in a method of the kind set forth in the opening part of this specification, in that the phase angle φ of the electrical power produced by the wind power installation or installations is varied in dependence on at least one voltage detected in the network.

In a wind power installation of the kind set forth in the opening part of this specification, that object is attained by an apparatus which is capable of carrying out the method according to the invention.

In a wind park of the kind set forth in the opening part of this specification, that object is attained by at least one respective apparatus which is suitable for carrying out the method according to the invention, and a respective voltage detection device, for each separately regulatable part of the wind park.

The invention avoids unwanted fluctuations in the voltage applied at the consumer, in particular the electrical voltage prevailing in a network, by the phase angle of the delivered power being varied in dependence on the voltage of the consumer or the network. That compensates for unwanted fluctuations in voltage, which arise out of changes in the active power delivered by the wind power installation or installations and/or the power taken from the network by the consumers.

In a particularly preferred feature the phase angle is altered in such a way that the voltage at least one predetermined point in the network remains substantially constant. In that situation, to obtain the required regulating parameter, the voltage at least one point in the network is detected.

In particular that point can be a point other than the feed-in point. That detection of the magnitude of the voltage and a suitable change in the phase angle of the electrical power delivered by the wind power installation or installations can provide a quickly reacting and effective regulating system.

In a particularly preferred embodiment the values to be set for the phase angle are derived from predetermined characteristic values. Those characteristic values can preferably be provided in the form of a table in which a previously determined family of characteristic curves is represented in the form of discrete values, this making it possible to deduce the phase angle to be set.

In a preferred development of the invention the regulation system can directly or indirectly provide that, if the voltage fluctuations have exceeded the predetermined limit values, the voltage is brought back into the tolerance range again by the actuation of a switching device in the network, for example, a step transformer. At the same time or in relation thereto the phase angle is set for a predetermined period of time to a constant value—preferably a mean value, for example, zero, in order once again to be able to compensate for subsequently occurring voltage fluctuations, by a suitable change in the phase angle.

In a particularly preferred development of the invention suitable voltage detection procedures and setting operations in respect of the phase angle can also be implemented separately in electrically separate portions of the network, in order to regulate each portion in such a way that the voltage in each of the portions remains substantially constant.

A further development of the wind power installation according to the invention advantageously provides a regulating device having a microprocessor, as in that way it is possible to implement digital regulation.

A preferred development of the wind park set forth in the opening part of this specification provides that there are a respective apparatus which is suitable for carrying out the method according to the invention and a respective voltage detection device for each separately regulatable part of the wind park so that electrically separate portions of the network can also be separately regulated in such a way that the voltage in each portion of the network remains substantially constant.

Figure 9:
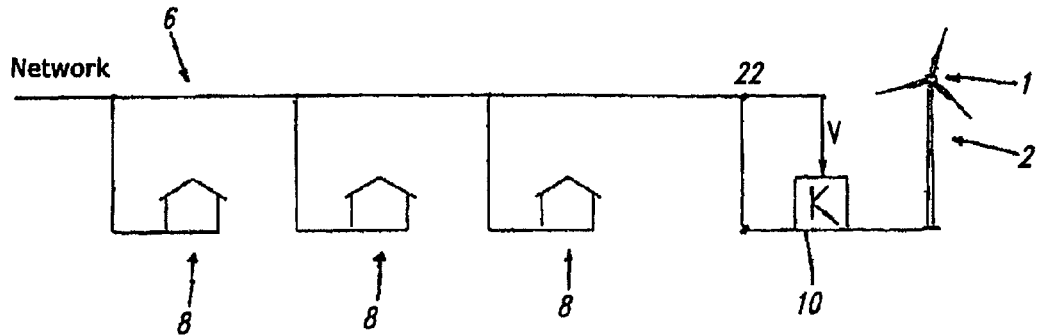
FIG. 9 is a view illustrating the coupling of a wind power installation to an electrical network according to one aspect of the present invention.

The invention is described hereinafter by means of an embodiment of a method of operating a wind power installation, with reference to the drawings in which:

A wind power installation 2 diagrammatically shown in FIG. 9, having a rotor 1, is connected to an electrical network 6 which, for example, can be a public power network. A plurality of electrical consumers 8 are connected to the network. The electrical generator 12 shown in FIGS. 1 and 10 of the wind power installation 2 is coupled to an electrical control and regulating apparatus 10 which firstly rectifies the alternating current produced in the generator and then converts it into an alternating current at a frequency which corresponds to the network frequency. The control and regulating apparatus 10 has a regulating device according to the invention.

A voltage detection device 22 can be provided at any point 22 in the network 6, the voltage detection device measuring, besides the phase in particular the magnitude of the network voltage and returning the measured value to the regulating device 10 as a suitable regulating parameter.

Figure 10:
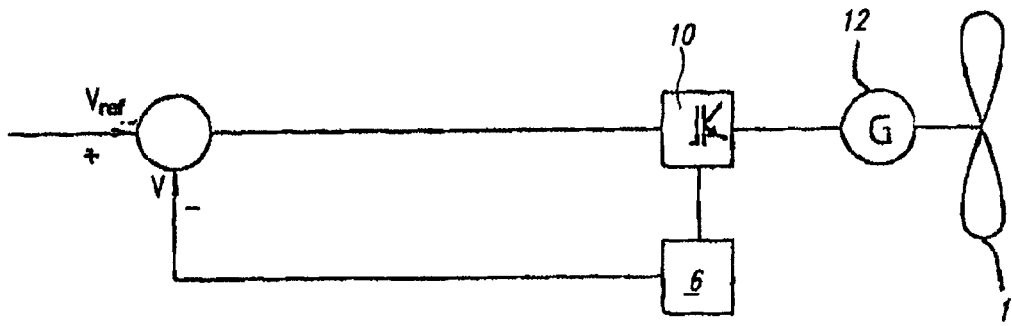
FIG. 10 shows a regulating device according to the invention for the operation of a wind power installation.

FIG. 10 illustrates the regulating device according to the invention. The diagrammatically illustrated rotor blades 1 are coupled to a generator 12 which produces electrical power which can depend on the wind speed. The ac voltage produced in the generator 12 can firstly be rectified regulator 10 and then converted into an ac voltage of a frequency corresponding to the network frequency.

The network voltage is measured at a location 22 in the network 6 by means of a voltage detector (not shown). In dependence on the ascertained network voltage—possibly by means of a microprocessor shown in FIG. 4—an optimum phase angle φ is calculated. The network voltage V is then regulated to the desired value $V_{ref}$ by means of the regulating device.

The electrical power delivered by the generator 12 to the network 6 is regulated by the change in the phase angle.

Figure 12:
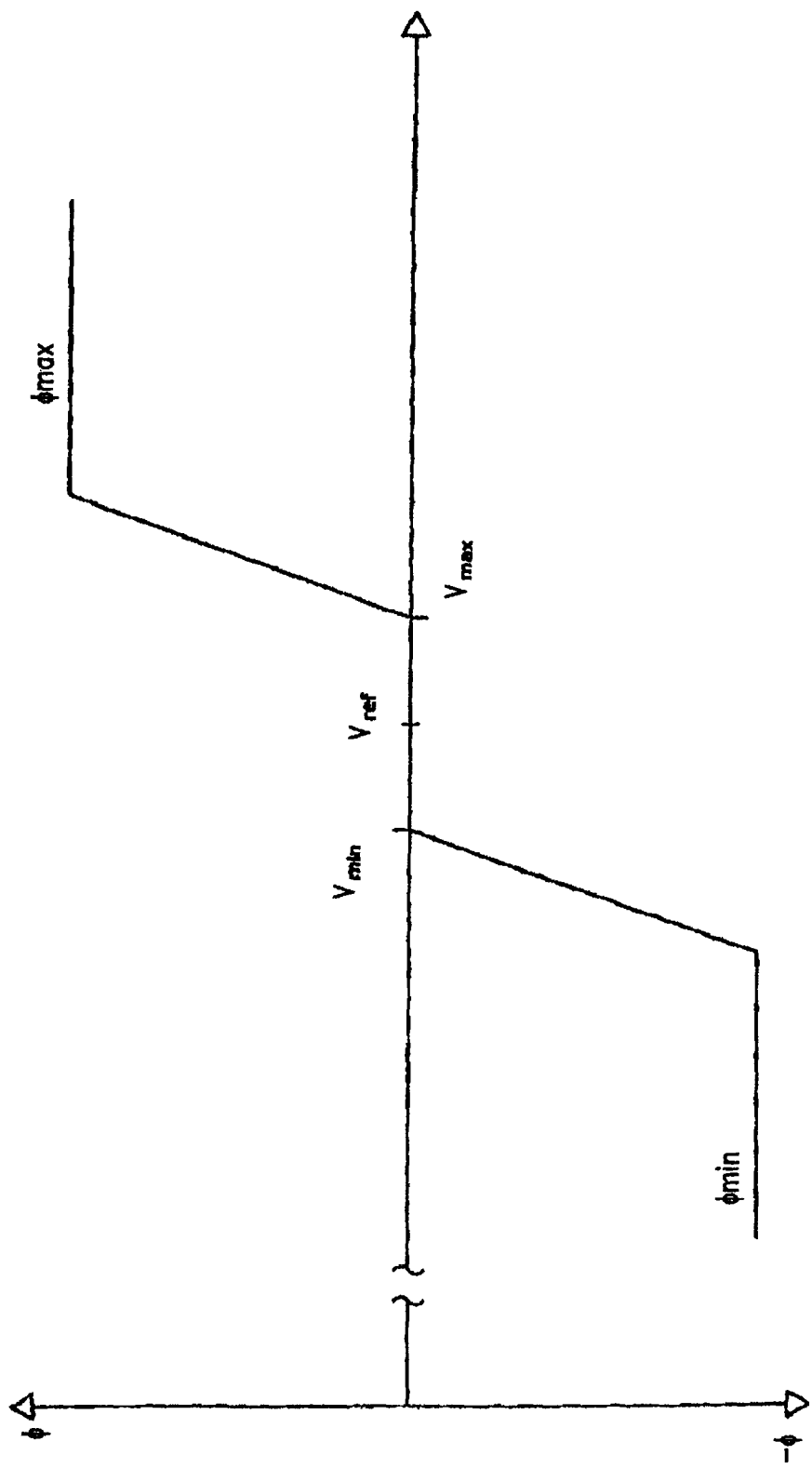
FIG. 12 is a view showing the relationship between network voltage and phase angle.

The view shown in FIG. 12 illustrates the relationship between the voltage in the network and the phase angle. If the voltage deviates from its reference value $V_{ref}$ which is between the voltage values $V_{min}$ and $V_{max}$ then, corresponding to the characteristic curve in the graph, the phase angle φ is altered in such a way that, depending on the sign of the deviation, either inductive or capacitive reactive power is fed into the network in order in that way to stabilize the voltage at the voltage detection point (at 22 in FIG. 9).

FIG. 11 shows some of the main components of the control and regulating apparatus 10 illustrated in FIG. 9. The control and regulating apparatus 10 has a rectifier 16 in which the alternating current produced in the generator is rectified. A frequency converter 18 connected to the rectifier 16 converts the initially rectified direct current into an alternating current which is fed into the network 6 in the form of a three-phase alternating current by way of the lines L1, L2 and L3.

The frequency converter 18 is controlled by means of a microprocessor 20 which is part of the overall regulating device. For that purpose the microprocessor 20 is coupled to the frequency converter 18. The input parameters for the microprocessor 20 are the currently prevailing network voltage V, the electrical power P of the generator, the reference value of the network voltage $V_{ref}$ and the power gradient dP/dt. The change according to the invention in the power which is to be fed in is implemented in the microprocessor 20.

Figure 13:
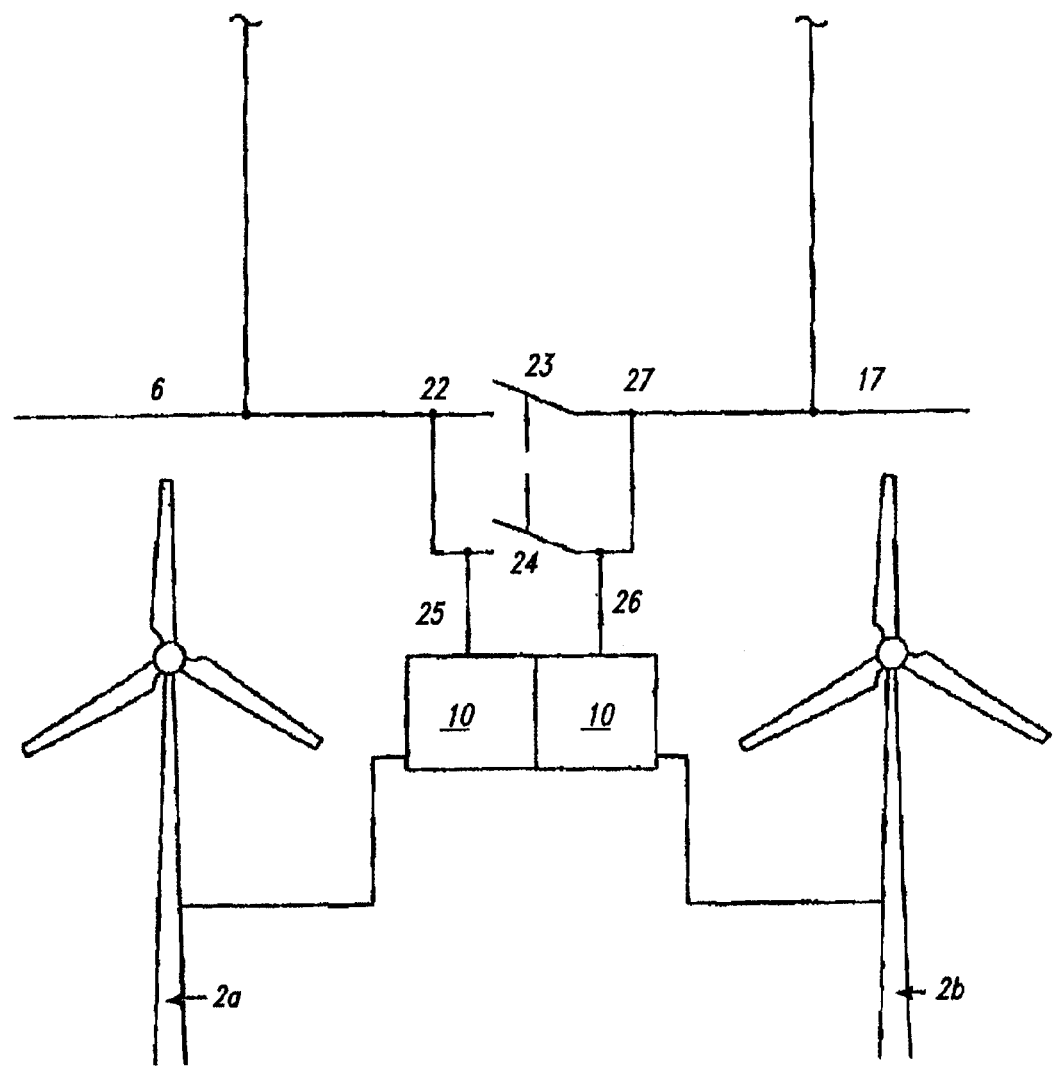
FIG. 13 shows a simplified view of regulation of a plurality of wind power installations, the regulation being separate or common according to the respective network situation.

FIG. 13 shows two wind power installations 2a and 2b, as an example of a wind park. A regulating apparatus 10 is associated with each of those wind power installations 2 which naturally can also symbolically stand for a respective plurality of wind power installations. The regulating apparatus 10 detects the voltage at predetermined points 22, 27 in the network 6, 17 and transmits the voltage by way of lines 25, 26 to the respectively associated regulating apparatus 10.

The portions 6, 17 of the network can be connected together or separated from each other, by way of a switching device 23. Provided in parallel with the switching device 23 is a switching device 24 which makes it possible for the two regulating apparatuses 10 to be connected together or separated from each other, according to the switching condition of the switching device 23.

If therefore the two portions 6, 17 of the network are connected together, then the two regulating apparatuses 10 are also connected to each other so that the entire network is considered as a unit and is supplied by the entire wind park as a unit, wherein the wind park is again regulated in unitary fashion in dependence on the voltage at the detection point 22, 27.

If the two portions 6, 17 are separated by the switching device 23, the regulating apparatuses 10 are also separated from each other in such a way that a part of the wind park is monitored by a detection point 22 by way of a line 25 by the regulating apparatus 10 and the associated part of the wind park can be correspondingly regulated, while the other portion of the network 17 is monitored by a detection point 27 by way of a line 26 by means of the regulating apparatus 10 which correspondingly regulates the other part of the wind park to stabilize the voltage in the portion 17 of the network.

It will be appreciated that this division does not have to be limited to two portions. It can be 3, 4 or 5 portions. That division can be taken as far as associating an individual installation with a portion of the network.

Central regulation of a wind park, in accordance with the invention, generally aims to provide that the wind park not only feeds electrical energy into a public power supply network but also at the same time can be controlled in such a way as to support the network, preferably by the operator of the public network power supply utility. Insofar as reference is made to a wind park in the present application, that is also intended to denote an individual wind power installation and not only always a plurality of wind power installations, in which respect it is preferably precisely a plurality of wind power installations that always forms a wind park.

For the central control of the wind park, in accordance with the invention, the operator of the public power supply network not only has a control access by means of a suitable control line (bus system) to the wind park/to the wind power installation, but he also receives from the wind park/wind power installation data, such as, for example, measured wind data, data about the status of the wind park, and also, for example, data about the available power (currently prevailing power) (active power)) of the wind park.

Such a central control can also mean, for example, that the wind park is entirely taken off the network in certain circumstances, for example, if the network connection rules which are preset by the operator of the public supply network cannot be observed on the part of the wind park.

If, for example, the voltage in the network falls below a given predetermined value, for example, to a value of between 70 and 90% of the network voltage, the wind park must be separated from the network within a predetermined time, for example, between two and six seconds.

Finally it is necessary to provide that the change in power (dP) of the wind park is not only predetermined by the wind but can also still alter at entire given time intervals. That power parameter is therefore also referred to as the power gradient and specifies by how many percent the respective available power may alter within a predetermined time (for example, per minute). Thus, for example, it can be provided that the power gradient of the wind park may be at a maximum between 5 and 15%, preferably 10% of the network connection capacity per minute.

Such regulation of the wind park can be effected, for example, by all wind power installations of a park simultaneously or uniformly increasing their power delivery in the predetermined power gradient. It will be appreciated that alternatively it is also possible to envisage that, in the case of a wind park of, for example, between 10 and 20 installations, firstly one or two installations (at the respective order of magnitude of the power gradient) initially feed into the network at full power and then in accordance with the respective predetermined power gradient further installations are cut in, within a predetermined time, until all of the available power of the wind park can be fed into the network.

A further aspect of the wind park regulation according to the invention is the provision of the reserve power at the level of a percentage, for example, 10%, of the currently available power of the wind park, or a fixed value, for example, between 500 kW and 1 MW or more per wind park. That reserve power is not to be confused with a park power which exceeds the network connection power of the wind park. The reserve power decisively involves a power reserve (this concerns both active power and also reactive power) which it does not exceed in the range of the network connection power. That reserve power can be prescribed by the operator of the public supply network. That is to say, if therefore sufficient wind is available to feed the network connection power from the wind park into the network, the power supply utility, by virtue of the prescribed control intervention into the wind park, can provide that this theoretically possible power is not completely fed into the network, but a part of that power remains available as reserve power. A particular aspect of that reserve power is that, in the event of an unexpected failure of power station power (at other locations at which power is fed into the network), the network can be stabilized by way of calling up the corresponding reserve power.

Accordingly, with the above-indicated central control of the wind park, the power fed into the network is under normal circumstances therefore less than the power to be made available by the wind park (maximum available power), in dependence on the respective power requirement in the network.

So that this above-described power control procedure can be implemented, the network operator also requires the prescribed data such as wind speed, installation status of the wind park (how many installations are in operation, how many are out of operation or damaged) and preferably also the maximum possible active power delivery. In that respect, in regard to the maximum possible active power delivery, the limitation can apply that this has to be provided in the form of data only when it cannot be determined from the wind speed and the installation status.

A normal bus system, for example, also a standardized bus system, can be used for control of the wind park and also for data supply for the power supply utility. There are already standardized interfaces for such standardized bus systems, for example, a Profibus system, so that central wind park control can also be implemented by means of suitably standardized control commands.

Supplemental to the foregoing, it can also be provided that the wind park, as from a pre-designed power, that is to say at a total power output of more than 50 MW, is treated as a large-scale power station and then must also satisfy the conditions for large-scale power stations.

Finally it can also be provided that the wind park is so regulated that the network connection value (the network connection capacity) is not exceeded.

Finally when switching on/cutting in the wind park it is also necessary to provide that unwanted network retroactions do not occur. For example, when switching on/cutting in a wind park, the current may not be higher than a predetermined value in respect of the nominal current which corresponds to the connection capacity. Such a value can be, for example, in the range of between 1.0 and 1.4.

If the frequency in the public power supply network rises then—as already described—it should be provided that, from a given frequency value, for example, from 50.25 Hz (with a nominal frequency of 50 Hz), the delivered active power of the wind park is automatically reduced until the network frequency is again stabilized at a value as described above.

Therefore it must also always be possible to operate the wind park at a reduced level of power delivery in order to be able to observe the network requirements. That power regulation also means that the power delivery (in particular active power) can be reduced to any desired value in any operating condition and from any operating point.

Thus, for example, it is possible to implement limitation of the feed-in power below the available feed-in power if there are dangers in regard to safe reliable system operation, bottlenecks or a risk of overloading in upstream-disposed networks are to be fixed, there is the danger of the formation of an island network, static or dynamic stabilities are endangered, the frequency rise can endanger the entire network system, and for example, repair operations or other operational-governed stoppages also have to take place at the power supply utility.

Besides the active power delivery which has already been described above and which is to be afforded if necessary, it must also be possible to provide a given reactive power, in which case it can also be set as wished by the power supply utility, more specifically both in the inductive and also in the capacitive range, that is to say underexcited and overexcited, in which respect the respective values can be predetermined for that purpose by the power supply utility.

In that connection, the reference value in respect of reactive power provision can be set variably, wherein the reference value presetting is effected at the network connection nodes for the power factor (cos phi) or a voltage magnitude. It is also possible to predetermine a fixed reference value.

As already described hereinbefore the power delivery is reduced and/or the wind park is completely taken off the network if frequency values in the network exceed/fall below certain levels. Thus, for example, the wind park can be taken off the network when the network falls below a network frequency of about 48 Hz (with a 50 Hz network frequency) or at 51 to 52 Hz. In that respect, at values below the intended range, it is still possible to provide within limits of the range that only a part of the current available power is fed into the network, for example, between about 80 and 95% of the current available power.

If, for example, the network voltage should also fall below a predetermined value, the same also applies here, as in the case of the deviating network frequency. In other words, when the voltage falls below or exceeds a predetermined network voltage in the given voltage, firstly a reduced power delivery takes place and, when the network voltage falls below or exceeds given limit values, the installations are completely taken off the network or at least the power fed into the network is set at zero.

Finally it can also be provided that, when given network voltage and/or network frequency values are reached, tried-and-tested shut-down of the wind park is effected, without a power delivery which has already been reduced being implemented beforehand.

That however also means at the same time that, with given frequency deviations/voltage deviations within a predetermined range around the network frequency/network voltage, automatic separation of the wind park from the network is not admissible.

Finally, for network protection purposes, it can also be provided that the shut-down time when the voltage value is exceeded is markedly shorter (for example, between 50 and 200 milliseconds) than in the case of voltage reduction protection (shut-down time of more than 1 second, preferably between about 2 and 6 seconds). In that respect, the shut-down time when the value of the upper frequency or lower frequency exceeds or falls below the predetermined, still just admissible limit value, is approximately in the region of the shut-down time when the voltage is in excess (above a predetermined voltage value).

Finally in the event of a fault in the network, for example, in a short-circuit situation, automatic separation of the wind park from the network should not always occur straightaway, but rather the wind park can also be controlled in such a way that, depending on the respective network connection, it still feeds into the network a contribution to the short-circuit power as apparent power in order in that way still to be able to afford network support to a certain degree. This means that the wind park, at least for a certain time for the duration of a short circuit but at a maximum only a few seconds, has to deliver the highest possible apparent current (apparent power) which however corresponds, for example, to once or up to 1.5 times the current which corresponds to the network connection capacity.

The above-described behavior can also be made dependent on the level of the nominal voltage, for example, if it exceeds a predetermined value of, for example, more than 50 kV.

So that the above-described shut-down procedures can take place in good time, for example, a protective relay (distance protective relay) is to be installed for the implementation thereof at the network connection node.

Finally means should also be provided which, upon start-up of a wind park, synchronize the voltage in the network and that of the wind park because, when the wind park is started up again, asynchronous voltages sensitively disturb the network and can cause it to shut down.

Insofar as in accordance with the present invention the power is regulated below a value of the power which is to be currently made available by a wind park, that can be implemented by various measures.

Thus, for example, the power can overall be reduced for each individual installation so that the entire wind park assumes the desired reduced power value. As an alternative thereto however it can also be provided that only individual installations are reduced in respect of their power feed-in value so that the total feed-in power value of the wind park again assumes the desired value.

Finally it can also be provided that, for example, a given power made available by the wind park is put into intermediate storage in so-called dump loads (resistors) or other energy storage means or is converted into another form of energy, such that the feed-in value of the wind park assumes the desired value.

The reduction in power output can also be afforded by a procedure whereby one wind power installation or given wind power installations are entirely removed from the network so that then once again the overall power of the wind park (in particular the active power thereof) can be set to the desired value and/or drops below the desired value.

For data transmission of the data in respect of the wind park (wind data, status data, power data etc) or for control of the wind park, it is also possible to provide a wireless communication arrangement so that the control data or information data can be wirelessly transmitted and processed.

In the case of the above-mentioned wind park regulation, it is also to be provided that, within the wind park, the procedure also involves ascertaining the value which can be made available as maximum energy and also then further ascertaining what amount of energy is fed into the network so that, taking the difference amount which is substantially due to control of the wind park on the part of the power supply utility, it is possible to calculate a feed-in recompense amount which if necessary is reimbursed.

As already described it is not only possible for the power supply utility which operates the power supply network to have the possibility of limiting or restricting the power output of the wind park or individual wind power installations with the access by way of a control line, for various reasons (network protection, servo power), but it is also possible for the operator of the public power supply network, at the same time, to obtain data relating to the status of the wind park, for example, data relating to the maximum available power, wind speed and so forth. As, when the power is restricted to below the currently available power, the wind park or the wind power installations of a wind park are not put to optimum use, that results in feed-in losses on the part of the wind power installation operators. Therefore here too the invention proposes the provision of a virtual current meter which detects the difference in respect of that which is not taken off by the intervention on the part of the power supply undertaking into the regulation system and thus the limitation in respect of the wind park or wind power installation power output. Such a 'virtual current meter' can on the one hand ascertain from the wind speed the power which is to be available and, if at the same time the power supply undertaking or anyone else reduces the power output of individual wind power installations or an entire wind park below the power output which can be made available, then by an integration operation it is possible to ascertain (count) the amount of energy which is not fed into the network. The virtual current meter makes it possible for the operator of the wind power installation to obtain remuneration also for the 'virtual current', that is to say the current which is not fed into the network by virtue of the interventions in regulation of the power supply. The 'virtual current meter' can be installed both at the operator of the wind power installation, in the wind power installations themselves within the wind park, at the power supply undertaking or also at the manufacturer of the wind power installations.

Insofar as the present application uses the term wind power installation, that is synonymous with the term wind park. Insofar as the present application describes various aspects of the invention they can be embodied together with the wind power installations or the control thereof. It is however also possible for the different approaches according to the invention to be implemented and claimed singularly without the further aspects of the invention, even if the present application usually describes various aspects of the invention together. It will be clear to the man skilled in the art however that various aspects of the invention can also be implemented and claimed differently and the common description thereof is thus not equivalent to them always having to be implemented and claimed together.

The invention claimed is:

1. A wind park, comprising:
    at least one wind power installation having a generator to deliver electrical power to an electrical network, the wind power installation being adapted to vary the amount of the electrical power that is delivered to the electrical network in dependence on a network frequency of the electrical network;
    a frequency sensor circuit coupled to receive the frequency of the electrical network;
    a control circuit coupled to the wind power installation and receiving an input from the frequency sensor circuit, the control circuit being configured such that the electrical power which is delivered by the wind park and fed into the electrical network is reduced when the network frequency of the electrical network deviates from a defined value by a threshold amount.

2. The wind park according to claim 1 wherein the electrical power which is delivered by the wind park and fed into the electrical network is reduced when the network frequency of the electrical network exceeds or falls below a defined value.

3. The wind park according to claim 1 wherein the threshold amount is in the range of 0.3% to 0.6% of the network frequency.

4. The wind park according to claim 1 wherein the at least one wind power installation comprises:
    a rotor and an electrical generator coupled to the rotor to deliver electrical power to the electrical network, and a regulating device with a frequency detector to measure a frequency of the electrical power applied to the electrical network and the electrical power delivered to the electrical network by the wind park is adjustable in dependence on the network frequency measured by the frequency sensor circuit or can be adjusted from an exterior.

5. The wind park according to claim 4 wherein the regulating device includes a microprocessor.

6. The wind park according to claim 5 wherein the wind power installation includes an inverter coupled to the microprocessor.

7. The wind park according to claim 1 wherein mechanical power of the wind power installation is produced by adjustable rotor blades being set into wind.

8. The wind park according to claim 1 wherein the defined value is 50 Hz.

9. The wind park according to claim 1 wherein the defined value is 60 Hz.

10. The wind park of claim 1 wherein the electrical power fed into the electrical network is reduced when the network frequency of the electrical network is greater than the defined value by the threshold amount.

11. The wind park of claim 1 wherein the electrical power fed into the electrical network is reduced when the network frequency of the electrical network is less than the defined value by the threshold amount.

12. A wind park, comprising:

at least one wind power installation having a generator to deliver electrical power to an electrical network, the wind power installation being adapted to vary the amount of the electrical power that is delivered to the electrical network in dependence on a network frequency of the electrical network, a frequency sensor coupled to the electrical network for measuring the frequency of the electrical network;

a control circuit coupled to the output of the wind power installation and to the frequency sensor, the control circuit being configured to reduce the power output from the wind power installation onto the electrical network when the measured frequency of the electrical network varies from a defined value by more than a threshold amount.

13. The wind part according to claim 12 further including:

a rectifier circuit coupled to the output of the at least wind power installation for converting the AC voltage output of the wind power installation to DC voltage; and a voltage inverter circuit coupled to the output of the rectifier circuit for converting the DC voltage to an AC voltage having the frequency and voltage level of the electrical network.

14. A wind park, comprising:

a wind turbine means for generating electricity, the wind turbine means having a plurality of blades that rotate based on power from the wind and an electrical generator means for generating power from the rotating blades;

power transfer means for transferring the generated power from the wind turbine means to an electrical network that is outside of the wind turbine means;

a frequency sensor means for receiving the frequency of the electrical network;

a control means for reducing the amount of power transferred from the wind turbine means to the electrical network when the network frequency of the electrical network deviates from a defined value by greater than a threshold amount.

15. The wind park according to claim 14 wherein the threshold amount is in the range of 0.3% to 0.6% of the network frequency.

* * * * *